Dec. 30, 1952  E. M. S. DE GIALLULY  2,623,995
MULTIRANGE TUNING CIRCUIT
Filed Oct. 25, 1950
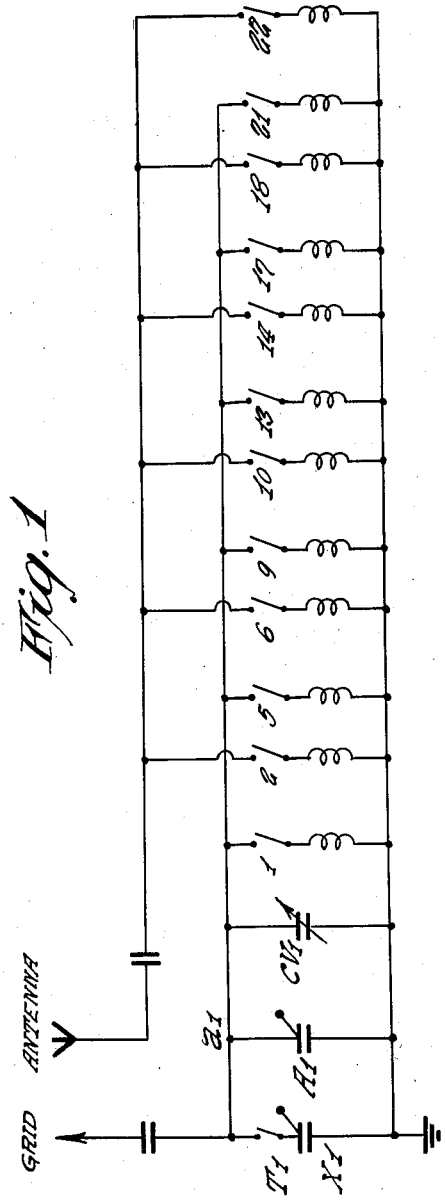
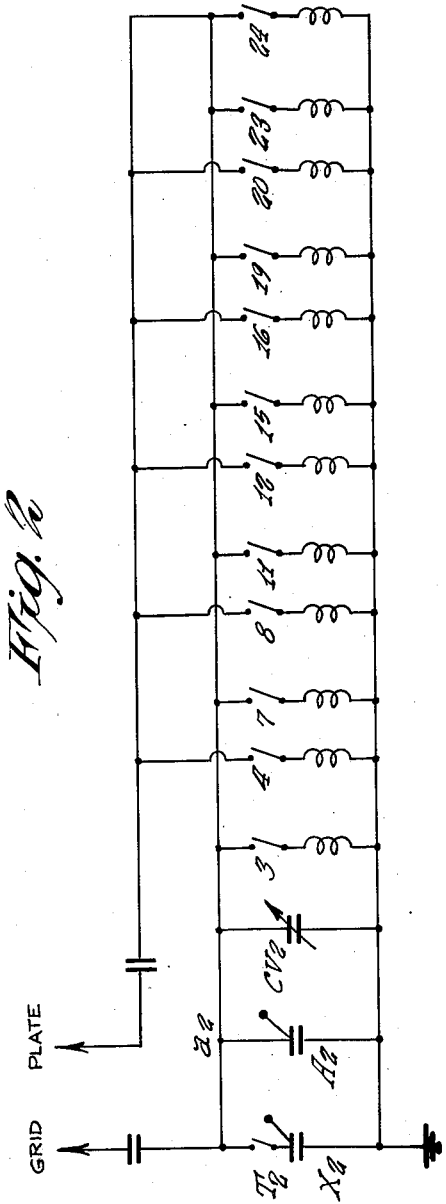
INVENTOR.
ELIE MARCEL SCEMAMA de GIALLULY
BY
Carl Miller
ATTORNEY Patented Dec. 30, 1952

2,623,995

UNITED STATES PATENT OFFICE 2,623,995

MULTIRANGE TUNING CIRCUIT

Elie Marcel Scemama de Gialluly, Paris, France

Application October 25, 1950, Serial No. 191,962
In France October 28, 1949

1 Claim. (Cl. 250—20)

This invention relates to radio receiving sets.

According to the present practice, radio receiving sets are constructed without a continuous tuning scale for each wave range, but with subdivisions of said wave range arranged in a series of separate and discontinuous bands. If spreading is desired, in the short wave range of the order of two to four meters per band, and if it is desired to cover the currently used short wave range of eighteen to fifty meters, gaps are found to be present. For example, in the preferred case of a receiver with six or so called spread out short wave bands, the receiver will receive the ten to twelve meter band, the eighteen to twenty meter band, the twenty-five to twenty-eight meter band, the thirty to thirty-five meter band, and so forth which leaves gaps between twelve and eighteen meters, twenty and twenty-five meters, and so forth. It is possible to increase the number of circuits, but this also increases the difficulty of manufacturing cost and the difficulties of adjustment during manufacture.

Also in practice, radio waves are divided into three classes, short waves, medium waves and long waves. It has become a common practice to divide short waves to ranges or bands. Some sets also have two ranges of medium waves and it is possible to divide medium waves into a larger number of ranges or sub-divisions and similarly for long waves as already mentioned above. The condensers or inductance coils, used for increasing, multiplying the utilization of the circuits, for creating new ranges, bands or sub-divisions for reception, should be different for medium, long and short waves, but it is possible to switch them all in one operation, and by means of the same cut-off or change-over switch, contactor or any other means for that purpose. The modification is common to all circuits of the same class, either medium or long or short waves, but the switch of all circuits and the placing in service of the condensers or inductances for each class and for the other desired classes is simultaneous.

In Hertzian wave transmitting apparatus, including apparatus for measuring or adjusting by means of Hertzian wave transmission, the wave lengths covered by the apparatus are split or divided into a fractioning determined by the manufacturer and by the possibilities of manufacture. It is common, for instance, to cover from thirty megacycles to one thousand kilocycles in ten bands, each one of them being, in principle, the continuation of the preceding band. It is obvious that as the spacing selected between two wave lengths is more important, the sweep area covered by the variable tuning condenser or condensers or any other means used for this sweep is larger. The greater this area, the more the drawbacks of the system are present, i. e., a close adjustment, the use of variable tuning condensers having a large capacity, the necessity of having either a very high driving demultiplication, or a vernier, or a trimming condenser or a combination of these various methods, a precision operation which depends partly on the manual skill of the user, a large number of kilocycles covered by the adjustment condenser or condensers and difficulties in calibrating the dial for direct reading.

It is an object of the invention to provide a radio receiving set which makes possible by depressing a suitable switch knob or button to displace the whole of the receiving bands so as to increase the number of said bands by doubling, trebling and so forth the utilization of the tuned circuits of the set and to allow the receiving of the radio transmissions by decreasing or eliminating the above-mentioned gaps without altering the general adjustment of the apparatus.

Other objects of the present invention are to provide apparatus for measuring and adjusting by means of Hertzian wave transmission to eliminate the above disadvantages and to make it possible to cover the wave lengths used by a large number of ranges, twenty-thirty-forty, starting from a ten range set, to allow each range a reduced difference of wave lengths to be covered, to provide the use of variable tuning condensers or any other means having a small capacity or a small inductance, to provide a deep spreading and render it possible to cover less than one meter for waves below ten meters over the whole range of the variable tuning condenser, to make possible the setting up of direct reading dials and to provide for the multiplication of existing ranges by one, two, three and so forth without creating any new circuits for tuning, antenna and oscillating circuits.

The invention will be more easily understood by reference to the drawings in which Figs. 1 and 2 are respectively diagrammatic views, the Fig. 1 showing tuning circuits, 1—2, 5—6, 9—10, 13—14, 17—18 and 21—22, each one of which pertains to one of the receiving bands, and the visual indications of which are given on the dial of the radio set, and Fig. 2 showing the oscillating circuits, the inductance coils cooperating with the condensers A1, CV1 and CV2 of the respective diagrams.

It will be apparent that the receiving range may be displaced as a whole and for the six bands provided in the example considered, by a modification of these elements of tuning circuits and oscillating circuits, a modification which may be effected in an extremely simple manner by the addition, in parallel with condensers A1 and A2 of condensers X and X2, the result of which will be to modify the resonance frequencies of the tuning circuits and of the oscillating circuits for the six receiving bands.

The condensers are connected on one hand to the mass of the apparatus and on the other hand to the terminals $a1$ and $a2$ of condensers A1 and A2, as shown on the drawing, Figs. 1 and 2, respectively. The connection with these terminals $a1$ and $a2$, however, may be broken at will by means of switches T1 and T2 which may be placed in circuit when it is desired to displace the bands normally received and out of circuit when it is desired to come back to normal reception. A modification of the tuning capacities will displace the receiving bands by displacing the resonance frequencies of the tuning circuits and of the oscillating circuits and the initial adjustment of the apparatus is restored by placing said condenser out of circuit by acting on the T1 and T2 cut-off switches.

Thus, by merely changing the position of a switch, it is possible to pass from the normal spreading of the receiving ranges to another spreading in which all ranges are displaced in the direction of increasing wave lengths, and the news ranges may cover all or part of the gaps between the first ranges or partly overlap on the initial ranges.

The advantage of the present invention consists in that all ranges are displaced simultaneously and in that the adjustment for the normal ranges is not affected at all and is restored when the switch is put back in the out-of-circuit position. It will be apparent that the arrangement described is capable of various modifications. A similar effect might be obtained by acting in a similar manner on all of the tuned coils which might thus be all increased or decreased by the insertion in series or in parallel of an additional coil which could be connected with the same circuits through a switch. It has been found more advantageous for constructional reasons and for greater convenience, to act on the condensers in the above described manner.

In the present construction of a reception with six short wave bands, the application of the device which provides also for twelve short wave bands. It is also possible within the scope of the present invention to double, treble, and so forth the number of bands in a radio receiving set. It is further possible to apply the invention to part of the bands only so as to make a six band receiver into a seven, eight, nine, ten and so forth band receiver of short waves.

This example which has been applied to short waves may also be applied to waves of all lengths.

According to the invention, there is provided the use of existing circuits in Hertzian wave receiver and transmitters, measuring and adjusting apparatus transmitting Hertzian waves for obtaining a more effective fractioning of all the wave lengths covered without creating any new tuning, oscillating or antenna circuits to the same extent. The condensers, coils or inductances in tuning, oscillating and antenna circuits being inserted and common to a group of existing circuits and determined during the manufacture of the apparatus. If desired, the following band may overlap the preceding band of using condensers, coils or inductances with a circuit value lower than the value of variation of the variable tuning condenser or condensers. Condensers, coils or inductances may be placed in and out of the circuit by means of one or more change-over switches or by any other suitable means for obtaining this result. The same change-over switch or the like can be used for simultaneously several multiplication systems and the use of variable condensers especially in the case of variable tuning condensers may be used, or fractioned with different capacities according to whether one operates with short, medium or long waves.

It will be seen that circuits already existing in the radio receiver can be used for increasing, doubling, trebling and so forth the number of ranges, bands or sub-divisions by the addition of condensers or inductance coils, by switching all of the various classes or waves or of the classes desired by means of a simultaneous switching of all classes with a common modification for all circuits in one class.

Having thus set forth and disclosed the nature of my invention, what is claimed is:

A tuning circuit comprising a common connection, a plurality of inductances having two terminals, at least some of said inductances being arranged in pairs, one terminal of each of said inductances being connected to said common connection, a second connection, a plurality of switches coordinated to the said inductances, one of each of the pairs of inductances being connected through the corresponding of the said switches to the said second connection, a third connection, the other of the pairs of inductances being connected through the said corresponding switches to the said third connection, a plurality of condensers, means for connecting the said condensers between said first and said second connection, at least one of the said last-mentioned connections including a switch, an antenna connected to the said third connection, and means for connecting the said second connection to an input of a radio-receiver, whereby by choice of inductances and capacities various band ranges may be chosen.

ELIE MARCEL SCEMAMA DE GIALLULY.

REFERENCES CITED

The following references are of record in the file of this patent:

UNITED STATES PATENTS

| Number | Name | Date |
|---|---|---|
| 1,863,050 | Hotopp, Jr. | June 14, 1932 |
| 1,945,557 | Long | Feb. 6, 1934 |
| 2,210,379 | Pasma | Aug. 6, 1940 |

FOREIGN PATENTS

| Number | Country | Date |
|---|---|---|
| 501,692 | Great Britain | Mar. 3, 1939 |